(12) United States Patent
Rautenberg

(10) Patent No.: US 11,312,198 B2
(45) Date of Patent: Apr. 26, 2022

(54) AIR SPRING STRUT HAVING A PLASTIC AIR SPRING COVER MADE OF THERMOPLASTIC

(71) Applicant: Continental Teves AG & Co. OHG, Frankfurt (DE)

(72) Inventor: Kai Marcus Rautenberg, Frankfurt (DE)

(73) Assignee: Continental Teves AG & Co. OHG, Frankfurt am Main (DE)

(*) Notice: Subject to any disclaimer, the term of this patent is extended or adjusted under 35 U.S.C. 154(b) by 332 days.

(21) Appl. No.: 16/579,026

(22) Filed: Sep. 23, 2019

(65) Prior Publication Data

US 2020/0101808 A1    Apr. 2, 2020

(30) Foreign Application Priority Data

Sep. 28, 2018   (DE) .............. 10 2018 216 717.6

(51) Int. Cl.
*F16F 9/084* (2006.01)
*B60G 15/14* (2006.01)
*F16F 9/32* (2006.01)

(52) U.S. Cl.
CPC .............. *B60G 15/14* (2013.01); *F16F 9/084* (2013.01); *F16F 9/3207* (2013.01);
(Continued)

(58) Field of Classification Search
CPC .............. B60G 15/14; B60G 2202/314; B60G 2206/42; B60G 2206/7101;
(Continued)

(56) References Cited

U.S. PATENT DOCUMENTS 6,336,610 B1    1/2002  Wode
7,258,330 B2 *  8/2007  Harms .................... F16F 9/057
                                                        267/64.23
(Continued)

FOREIGN PATENT DOCUMENTS

CN        111433486 A    7/2020
DE    102004031875 A1   11/2005
(Continued)

OTHER PUBLICATIONS

Chinese Office Action dated Sep. 17, 2021 for the counterpart Chinese Patent Application No. 201910918060.4.
(Continued)

*Primary Examiner* — Thomas W Irvin

(57) ABSTRACT

Air spring strut for a motor vehicle comprising an air spring with a shock damper for the spring-cushioning and damping of oscillations of a motor vehicle chassis, wherein the air spring comprises an air spring cover and a rolling piston, wherein a rolling bellows of elastomer material is clamped in an airtight manner between the air spring cover and the rolling piston. The air spring cover comprises a damper bearing receptacle in which a damper bearing of the shock damper is arranged, and the air spring cover comprises a clamping base to which a first end of the rolling bellows is attached. At least the damper bearing receptacle of the air spring cover is produced completely from a plastic material, and the plastic material is a thermoplastic.

13 Claims, 2 Drawing Sheets

(52) U.S. Cl.
CPC .... *B60G 2202/314* (2013.01); *B60G 2206/42* (2013.01); *B60G 2206/7101* (2013.01); *B60G 2206/7104* (2013.01); *F16F 2224/02* (2013.01); *F16F 2224/0241* (2013.01); *F16F 2230/16* (2013.01)

(58) Field of Classification Search
CPC ....... B60G 2206/7104; B60G 2206/424; F16F 9/084; F16F 9/3207; F16F 9/0454; F16F 9/0463; F16F 9/0472; F16F 2224/02; F16F 2224/0241; F16F 2230/16
USPC ...................................................... 267/64.24
See application file for complete search history.

(56) References Cited

U.S. PATENT DOCUMENTS

| | | | | |
|---|---|---|---|---|
| 8,474,798 | B2* | 7/2013 | Jeischik | F16F 9/0454 267/122 |
| 10,525,782 | B2* | 1/2020 | Derr | F16F 9/54 |
| 10,618,366 | B2* | 4/2020 | Pniewski | F16F 9/3271 |
| 10,703,158 | B2* | 7/2020 | Pielock | B60G 11/27 |
| 10,851,864 | B2* | 12/2020 | Pielock | F16F 13/002 |
| 2002/0011697 | A1 | 1/2002 | Pesch et al. | |
| 2004/0017035 | A1 | 1/2004 | Trader et al. | |
| 2005/0236749 | A1 | 10/2005 | Gross et al. | |
| 2010/0237549 | A1* | 9/2010 | Jeischik | B60G 15/14 267/122 |
| 2014/0252743 | A1 | 9/2014 | Pielock | |
| 2018/0009283 | A1* | 1/2018 | Pniewski | F16F 9/084 |
| 2018/0015800 | A1 | 1/2018 | Derr et al. | |
| 2019/0186580 | A1* | 6/2019 | Pielock | F16F 9/05 |
| 2020/0039309 | A1* | 2/2020 | Pielock | F16F 9/54 |
| 2020/0223275 | A1* | 7/2020 | Gleu | B60G 15/12 |
| 2020/0290422 | A1* | 9/2020 | Rautenberg | F16F 9/084 |
| 2021/0283967 | A1* | 9/2021 | Pielock | F16F 9/0454 |

FOREIGN PATENT DOCUMENTS

| | | |
|---|---|---|
| DE | 102007004037 A1 | 7/2008 |
| DE | 102012012902 A1 | 1/2013 |
| DE | 102012012995 A1 | 1/2014 |
| DE | 102013212982 A1 | 6/2014 |
| DE | 102015100281 A1 | 7/2016 |
| EP | 0264573 B1 | 11/1990 |
| EP | 1380452 A2 | 1/2004 |
| EP | 1424506 A1 | 6/2004 |
| GN | 103842191 A | 6/2014 |

OTHER PUBLICATIONS

Search Report dated May 15, 2019 from corresponding Patent Application No. DE 10 2018 216 717.6.

* cited by examiner

AIR SPRING STRUT HAVING A PLASTIC AIR SPRING COVER MADE OF THERMOPLASTIC

CROSS REFERENCE TO RELATED APPLICATIONS

This application claims priority to German Patent Application No. DE 10 2018 216 717.6, filed Sep. 28, 2018, wherein the contents of such application is incorporated herein by reference.

TECHNICAL FIELD

An air spring strut with cover.

TECHNICAL BACKGROUND

An air spring strut, as known for example from DE 10 2012 012 902 A1, is arranged between the motor vehicle chassis or a wheel carrier and the motor vehicle body. In general, the air spring strut comprises an air spring and a shock damper. Here, the air spring performs the function of cushioning the wheel, while the shock damper damps the oscillations of the wheel and of the motor vehicle body.

The air spring substantially consists of an air spring cover, a rolling piston and a rolling bellows clamped therebetween in an airtight manner, thereby delimiting a working chamber under air pressure. The rolling bellows is enclosed by a sleeve-shaped outer guide and, during spring compression, rolls on the concentric rolling piston with the formation of a rolling fold. By way of the air spring cover, the air spring strut is connected to the motor vehicle body by means of appropriate fastening means.

The shock damper arranged within the air spring is connected on the one hand to the wheel carrier and is supportively fastened on the other hand via a damper bearing in the air spring cover by way of its piston rod, which can dip into the damper tube. Particularly in the dynamic operation of the air spring strut, high tensile and compressive forces act particularly on the pot-shaped bearing receptacle of the air spring cover. Since the damper bearing of the shock damper is mounted in this bearing receptacle and since at the same time the entire air spring strut is connected via it to the body, this component must have particular strength properties.

As is known, the majority of large-volume air spring covers are produced from at least two components. Here, with an integrally bonded connection of the components, use is made of an identical material, usually a metal, from which particularly the bearing receptacle is produced. Such a cover is known for example from DE 10 2013 212 982 A1.

In addition, a wide range of requirements is placed on the air spring cover of an air spring strut. As already stated, the entire air spring strut is attached to the motor vehicle body via the air spring cover. Furthermore, the air spring cover, as a pressure body or as a cover comprising a large air volume, constitutes a part of the spring-effective inner volume of the air spring. The air spring cover must therefore also ensure a pressure-tight closure of the interior of the air spring to the outside. In addition, the rolling bellows is attached by means of clamping rings to a clamping base provided by the air spring cover. Finally, the air spring cover must also make available pressure-tight receptacles for the air connection and additional volumes.

As a connection element between air spring strut and attachment to the chassis, high forces are channeled through the air spring cover. These forces which are channeled in and through are, on the one hand, of a static nature (carrying forces for supporting the vehicle weight) and of a dynamic nature (time-variable forces in driving operation as a result of the spring compression/spring extension state), the dynamic forces being superimposed on the static forces. Dynamic tensile and compressive forces, which are dependent on the spring rate, act on the air spring cover at the attachment point of the shock damper (damper bearing).

The forces acting on the air spring cover of an air spring strut also arise through the internally pressurizing gas force of the spring-effective cover chamber, which gas force, as a result of the variable pressure, can be divided into static and dynamic fractions.

To achieve complete tightness of the air spring cover, it would be functionally advantageous to produce said cover as a closed sleeve made of a material or a group of materials which can be effectively connected to one another, wherein this component is not breached by other components having for example more optimal strength properties. This is because such a breach has in turn to be sealed by particular measures. Any sealing is susceptible in terms of its pressure-tightness and additionally represents a further process step.

A composite cover made of different materials, namely plastic and metal, is known for example from DE 10 2015 100 281 A1.

What is concerned in this case is a metallic upper part which is overmolded with a thermoplastic. There is thus created a composite part which satisfies the sealing and strength requirements. Here, a flange made of a metallic material is provided for the damper bearing, via which flange the connection to the chassis is also produced. The metallic damper bearing receptacle represents a good solution in terms of the strength requirements, but is very heavy on account of its density. Therefore, the remainder of the cover sleeve of the air spring cover is also produced from a thermoplastic material in order to save weight. Here, the flange is surrounded by the thermoplastic material at least in certain areas, whereby the gas-tightness of the air spring cover is achieved.

However, a disadvantage of this solution is that, for pressure-tightness, a pressure-tight connection is required between the inner metallic flange and the pressure-tight cover sleeve facing the cover interior. This is realized at least in that the damper bearing receptacle is also overmolded on the inner side by the thermoplastic material. Said receptacle is further provided with an insert and a guide for the piston rod in order to ensure sufficient tightness. In addition, the damper bearing receptacle is closed on the upper side by a pressure-tight closure cover. All these measures are necessary on account of the stated breach.

What is needed is a way to provide an improved air spring cover of an air spring strut that ensures the gas-tightness in a simple manner, can at the same time be produced with a low weight and nevertheless has sufficient stability and strength.

Figure 1:
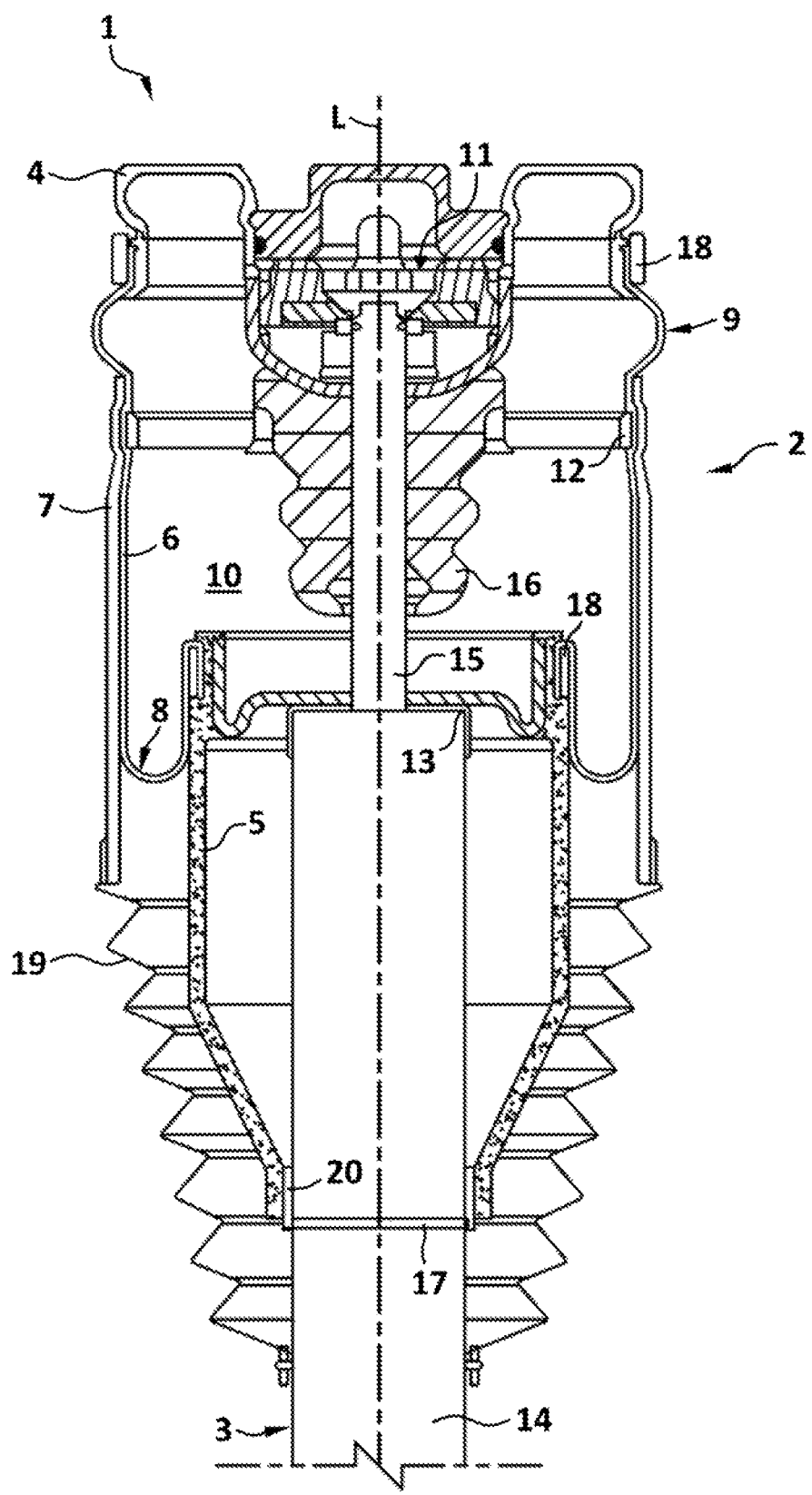
FIG. 1 shows an air spring strut according to the prior art.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

An air spring strut for a motor vehicle is provided, comprising an air spring with a shock damper for the spring-cushioning and damping of oscillations of a motor vehicle chassis, wherein the air spring comprises an air spring cover and a rolling piston, wherein a rolling bellows of elastomer material is clamped in an airtight manner between the air spring cover and the rolling piston, wherein the air spring cover comprises a damper bearing receptacle in which a damper bearing of the shock damper is arranged, and wherein the air spring cover comprises a clamping base to which a first end of the rolling bellows is attached, wherein at least the damper bearing receptacle of the air spring cover is produced completely from a plastic material, wherein the plastic material is a thermoplastic.

In principle, a person skilled in the art will have reservations in producing an air spring cover of an air spring strut, that is to say with mounting of the shock damper, exclusively from a plastic. This is because a plastic would not satisfy the strength requirements, in particular not in dynamic operation, as compared with a metallic material. Recourse has therefore always been had to a damper bearing receptacle produced from metal.

It has now been found in an inventive manner that a damping bearing receptacle produced completely from a thermoplastic material can satisfy the force requirements. That is to say in particular that the damper bearing receptacle is not reinforced by any further element. No further component of another material is provided to support the strength of the damper bearing receptacle. Only the damping bearing receptacle formed from the material of the air spring cover is provided for mounting the shock damper bearing.

Given an appropriate wall thickness in the wall region and bottom region, the damper bearing receptacle satisfies the force requirements and proves to be extremely stable in permanent operation. In other words, the dynamic tensile and compressive forces which emanate from the shock damper are successfully taken up by the thermoplastic material of the damper bearing receptacle and channeled into the motor vehicle body.

Thermoplastics have good moldability and weldability. These materials are therefore particularly suitable for the air spring cover of an air spring strut. The use of the thermoplastic allows a wide range of geometries in order to realize the greatest possible cover volume. At the same time, the thermoplastic has a sufficient strength in the damper bearing receptacle region, said strength being crucially determined by a variable filling material fraction. The thermoplastic is therefore preferably fiber-reinforced. Such thermoplastics can be PA6, PA6.6 or PA12.

The damper bearing of the shock damper is placed in the inner damper bearing receptacle. The damper bearing represents an elastic decoupling of the shock damper and is intended to alleviate the oscillations acting on the air spring cover. The damper bearing therefore generally comprises a load-bearing piece which is fastened to the free end of the piston rod by a nut on the latter. The load-bearing piece is in turn surrounded by an elastomer element and can be vulcanized together therewith. Generally, the elastomer element bears by its lower side in the damper bearing receptacle, while its radial outer wall bears against the cylindrical part of the damper bearing receptacle.

The damper bearing receptacle is preferably pot-shaped. The pot shape is distinguished at least by a bottom and by a hollow cylindrical wall. It is ideally suited to accommodate the damper bearing and can be effectively produced by plastic injection molding methods.

The bottom of the damper bearing receptacle is preferably constructed from the thermoplastic material. In addition, the wall of the damper bearing receptacle is also constructed from the thermoplastic material. Furthermore, the damping bearing receptacle comprises a collar by means of which the air spring strut is attached to the motor vehicle body. The collar or else edge extends radially outwardly from the hollow cylindrical wall. The collar is preferably constructed from the thermoplastic material.

All of these three regions of the pot-shaped damper bearing receptacle channel the acting forces into the body. Their configuration from thermoplastic material has proved to be extremely stable and load-bearing.

According to one or more embodiments, a ribbed structure having a plurality of stiffening ribs is provided within the air spring cover. The ribbed structure is formed inside the air spring cover by way of the plurality of stiffening ribs which are provided between the outer side of the damper bearing receptacle and the inner side of the cover sleeve and connect them. Consequently, the ribbed structure increases the overall strength of the air spring cover, particularly avoiding bursting as a result of the internal gas pressure.

The stiffening ribs are preferably formed from the thermoplastic material of the air spring cover. It is at this point that the advantages of the plastic injection molding method come to the fore since it allows a wide variety of ripped structures to be formed from the same material as the air spring cover in one process.

According to one or more embodiments, the clamping base is provided on the inner side with a metallic reinforcing ring. The rolling bellows is attached on its end side to the clamping base. In other words, an end portion of the upper rolling bellows end is in surface contact with the axial bearing surface of the clamping base and is fastened thereto by a clamping or locking ring. Depending on the requirement, a metallic ring is placed on the inner side of the clamping base in order to reinforce it.

According to one or more embodiments, the clamping base is produced from the thermoplastic material. Just like the damper bearing receptacle, the clamping base of the air spring cover is now produced from the thermoplastic. This clamping base has a high strength. With an appropriate design of the wall thickness, it also satisfies the force requirements placed on the rolling bellows clamping.

According to one or more embodiments, the air spring cover is produced in one piece and completely from the thermoplastic material. The entire air spring cover has, for the first time, been produced from a thermoplastic. In this design, the air spring cover comprises no breach of its inner structure for force take-up and of its outer structure for rolling bellows clamping. There is thus no need for separate sealing measures, such as the provision of sealing rings or overmolding of the damper bearing receptacle.

According to one or more embodiments, the air spring cover is of multipart configuration, at least comprising a first cover part, which comprises the damper bearing receptacle, and a second cover part, which comprises the clamping base, wherein at least the first cover part is produced from the thermoplastic material. Depending on the requirements placed on the volume of the spring cover that is to be encompassed, said cover is of two-part design. Whereas the first cover part represents the damper bearing receptacle, the second cover part forms a volume-encompassing cover or a sleeve which delimits the spring-effective cover chamber. The division into two cover parts increases the design freedom that is required to make available a large cover chamber.

The second cover part and its clamping base are optionally produced from a thermoplastic. Just like the one-piece cover, in this design, too, the second cover part has its outer wall and its clamping base produced from one of the stated thermoplastic materials. This can either be the same thermoplastic material as that of the first cover part, but does not necessarily have to be the same. For example, the first cover part is produced from PA12 and the second cover part is produced from PA6.

The first and the second cover part are connected to one another in an integrally bonded manner. The choice of a moldable and weldable thermoplastic allows not only new design forms but also easier manufacturability. The two cover parts can thus be connected to one another in their joining region in an integrally bonded manner by means of known plastic-welding methods.

According to one or more embodiments, the air spring cover comprises a plurality of receiving devices and a plurality of fastening means for attaching the air spring strut to the motor vehicle, wherein one of the fastening means is at least partially engaged in a respective one of the receiving devices.

In order to connect the air spring strut to a connection region, which is provided for this purpose, of the motor vehicle body, a plurality of receiving devices and fastening means are provided on the axial upper side of the air spring cover or of the first cover part. The fastening means, for example as screw bolts, comprise a shank with a head or anchor. The head or anchor is engaged in a receiving device provided in the air spring cover. The receiving devices are recesses which extend axially in the air spring cover. Since the air spring cover is injection-molded from a plastic material, the head or anchor of the fastening means is overmolded in the respective receiving devices by this plastic material, with the result that said fastening means are held securely in the receiving devices. The receiving devices are arranged in a distributed manner in the circumferential direction on the annular upper side of the air spring cover.

The air spring cover thus represents, by way of its damper bearing receptacle formed from thermoplastic material and by way of the receiving devices, the decisive force path into the motor vehicle body of the tensile and compressive forces which emanate from the shock damper.

The rolling bellows delimits, with the air spring cover and the rolling piston, a working chamber which is filled with compressed air. This volume-elastic working chamber represents the spring-effective volume of the air spring.

The air spring cover comprises a cover chamber. This cover chamber, preferably as a large-volume air chamber, expands the working chamber of the air spring and thus reduces the spring stiffness thereof.

The air spring strut is used in a chassis, optionally in an air spring system, for a motor vehicle.

FIG. 1 shows a known air spring strut 1 having the essential components, namely air spring 2 and shock damper 3, wherein the air spring 2 comprises an air spring cover 4, a rolling piston 5 and a rolling bellows 6 with an outer guide 7 which encloses it in the form of a sleeve. The shock damper 3 is provided within the air spring 2, the shock damper 3 comprising a damper tube 14, a piston rod 15 which can dip into the latter, and a damper bearing 11.

The air spring strut 1 satisfies two functional areas: on the one hand, the air spring 2 satisfies the generation of carrying force, whereas the shock damper 3 is responsible for linear guidance. Fastening means on the air spring cover 4 make it possible for the air spring strut 1 to be fastened on the one hand to a motor vehicle body and on the other hand, via a shock damper eye (not shown), to a wheel carrier of the motor vehicle chassis, with the result that the motor vehicle is spring-cushioned and damped.

This regular installed position of an air spring strut determines the "up/down" orientation.

The air spring 2 comprises a rolling bellows 6 of elastomer material, the rolling bellows 6 delimiting, with the air spring cover 4 and rolling piston 5, an airtight, volume-elastic working chamber 10 which can be filled with compressed air. The hose-shaped rolling bellows 6 is fastened by its first end to the air spring cover 4 and by its second end to the rolling piston 5 via clamping rings 18 at the connection regions of these air spring attachment parts.

In the case of relative movements along the longitudinal axis L of the air spring strut 1 between the air spring cover 4 and rolling piston 5, the rolling bellows 6 rolls on the concentric rolling surface of the rolling piston 5 with the formation of a rolling fold 8. Furthermore, the rolling bellows 6 forms a cardanic fold 9 on the air spring cover 4 that acts as a cardanic bearing. At the same time, the rolling bellows 6 is provided with embedded strength members.

Particularly in the case of the comfortable axial bellows, that is to say with strength members oriented in the axial direction, use is made of outer guides 7 to limit the lateral extension of the rolling bellows 6. Here, the outer guide 7 is clamped against the rolling bellows 6 by an inner locking ring 12 provided in the working chamber 10.

In order to protect the rolling fold 8 from contamination, there is provided a corrugated bellows 19 which is fastened, for example, to the wheel-carrier-side end region of the outer guide 7 and to the damper tube 14.

An additional spring 16 is arranged bearing against the lower side of the air spring cover 4 and facing toward the shock damper. The additional spring 16 has a through-bore for the piston rod 15 and therefore encloses the latter. During spring compression, the end side of the damper tube 14 moves toward the air spring cover 4, and therefore the additional spring 16 serves as a travel limiter and damps possible forces acting on the air spring cover 4.

The damper tube 14 of the shock damper 3 is provided within the rolling piston 5 or is surrounded by the hollow cylindrical rolling piston 5 at least in certain regions, it being possible for the rolling piston 5 to be fastened standing on the damper tube via a supporting ring 17 or hanging on the end side of the damper tube 14 via a bearing element 13. A combination of standing and hanging rolling piston 5 is also possible, as visible in the figure. It is additionally known to produce the rolling piston 5 from a light metal, such as aluminum, or a fiber-reinforced plastic.

In the case of a standing rolling piston 5, a sealing system 20, for example made up of elastomer sealing rings, is provided between the piston end region facing the wheel carrier and the opposite outer wall of the damper tube 14. This serves to seal to the outside the working chamber 10, which can be expanded within the rolling piston, of the air spring 2.

Figure 2:
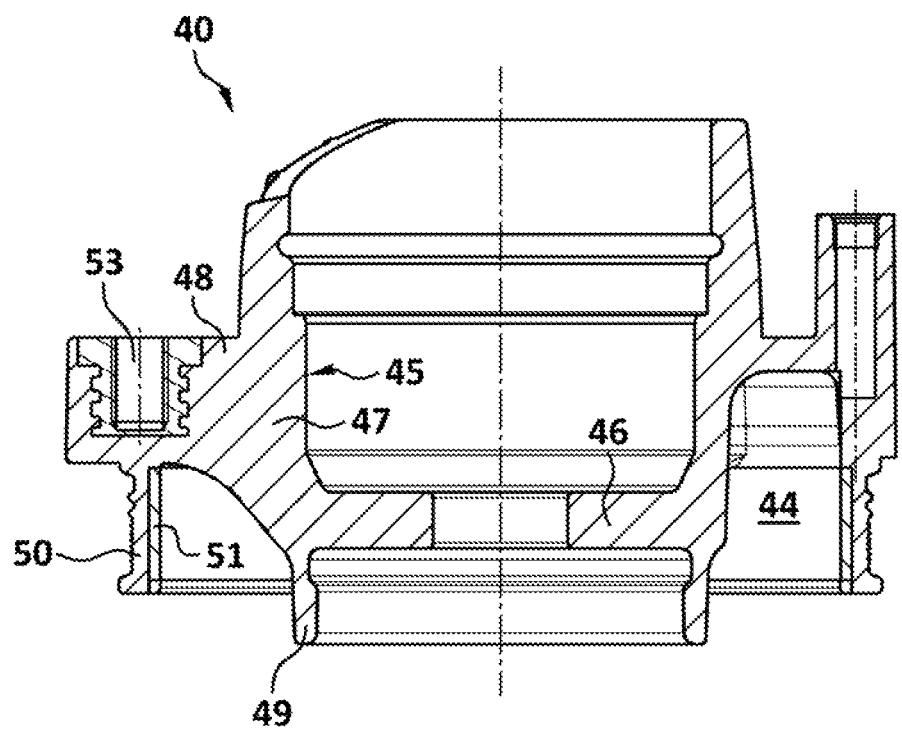
FIG. 2 shows a first exemplary embodiment of an air spring cover.

FIG. 2 shows a one-piece air spring cover 40 in vertical section. The air spring cover 40 of an exemplary air spring strut comprises an inner pot-shaped damper bearing receptacle 45 into which the damper bearing of a shock damper is inserted. At the same time, the entire air spring strut is attached by means of the air spring cover 40 to a motor vehicle body (not shown).

In order to mount the damper bearing, the inner pot-shaped damper bearing receptacle 45 comprises a pot bottom 46 with a through-bore for the shock damper piston rod. Extending from the pot bottom 46 is a hollow cylindrical pot wall 47 which is formed from the material of the air spring cover 40. At the upper edge of the pot wall 47, the latter merges into a radially outwardly extending pot collar 48. Finally, the pot collar 48 is extended downward and constitutes a clamping base 50 for rolling bellows attachment.

Furthermore, an additional-spring pot 49, into which an additional spring is inserted, is provided on the lower side of the damper bearing receptacle 45, that is to say on the side of the pot bottom 46 that faces away from the attachment to the motor vehicle body.

For pressure-tight sealing of the damper bearing, the latter is closed, in the installed state, from above by a closure cover. For this purpose, annularly encircling grooves or constrictions are formed on the inner wall of the damper bearing receptacle 45 or on the inner side of the pot wall 47. The closure cover is inserted and pressed into said grooves or constrictions.

By virtue of the pot collar 48 extended downward to form the clamping base 50, the air spring cover 40 at least partially makes available a cover chamber 44 which, as an air chamber expansion of the working chamber of the air spring, reduces the spring stiffness of said spring.

The pot collar 48 additionally comprises receiving devices 53 for fastening means. Fastening means, or the shank and head of screw bolts, are engaged in receiving devices 53 and are overmolded by the material of the air spring cover 40 and therefore secured. Receiving devices 53 are arranged in a distributed manner in the circumferential direction on the pot collar 48 and extend axially into said collar. The openings of the receiving device open on the axial surface of the pot collar 48. According to the example, three such receiving devices with respective fastening means are provided. The air spring cover 40 is therefore screwed to the motor vehicle body in a force-fitting manner by way of the fastening means.

A crucial aspect of the air spring cover 40 of the exemplary air spring strut is its material choice.

Particularly the structure- and strength-relevant region of the air spring cover 40, in concrete terms the damper bearing receptacle 45, is produced as a thermoplastic or from a thermoplastic material. It has proved to be the case that, with an appropriate design of the pot bottom 46 and configuration of the pot wall 47, the thermoplastic material satisfies the strength requirements placed on it. This is achieved for example in that the damper bearing receptacle is configured in such a way that, starting from the pot bottom 46 via the pot wall 47, a direct force path into the receiving devices 53 is produced. That is to say in particular that the tensile and compressive forces acting on the damper bearing receptacle 45 are reliably taken up and transmitted into the motor vehicle body. At the same time, the thermoplastic damper bearing receptacle 45 is lighter than a comparable damper bearing receptacle made of a metallic material.

The annularly encircling clamping base 50 constitutes an axial bearing surface for the attachment of the upper rolling bellows end. In a further embodiment, the clamping base 50 is reinforced on the inner side with a metallic reinforcing ring 51. The clamping base 50 of the air spring cover 40 is advantageously produced from the same thermoplastic material as the cover 40 itself. The production of the clamping base 50 from thermoplastic material leads to a high strength combined with low density. Therefore, the air spring cover 40 with clamping base 50 made of thermoplastic material ensures cost-effective manufacturing and an overall lighter air spring strut.

Figure 3:
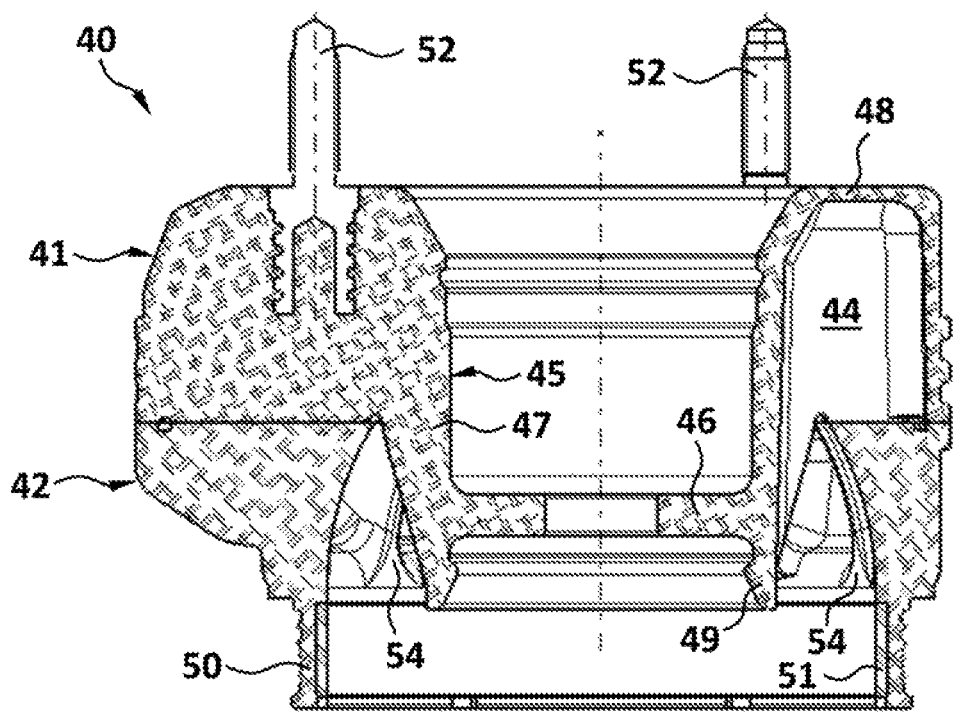
FIG. 3 shows a second exemplary embodiment of an air spring cover.

FIG. 3 shows in perspective view a multipart air spring cover 40 in vertical section of an exemplary air spring strut. To satisfy the requirements placed on the air spring cover 40 (force take-up and volume formation), it has been subdivided into a plurality of cover parts 41, 42.

A first cover part 41 serves to receive the shock damper bearing and in part also to fasten the air spring strut to a motor vehicle body (not shown). In order to mount the damper bearing, the first cover part 41 has an inner pot-shaped damper bearing receptacle 45. This damper bearing receptacle 45, which is formed from the material of the first cover part 41, comprises a pot bottom 46 with a through-bore for the shock damper piston rod. Extending from the pot bottom 46 in the axial direction is a substantially hollow cylindrical pot wall 47 which is formed from the material of the first cover part 41. At the upper edge of the pot wall 47, the latter merges into a radially outwardly extending pot collar 48.

Furthermore, an additional-spring pot 49, which is likewise formed from the material of the first cover part 41 and into which an additional spring is inserted, is provided on the lower side of the damper bearing receptacle 45, that is to say on the side of the pot bottom 54 that faces away from the attachment to the motor vehicle body.

For pressure-tight sealing of the damper bearing, the latter is closed, in the installed state, from above by a closure cover. For this purpose, an annularly encircling groove and a constriction are formed on the inner wall of the damper bearing receptacle 45 or on the inner side of the pot wall 47. The closure cover is inserted and pressed into said groove and constriction.

The shape and configuration of a second cover part 42 realizes a part of the spring-effective cover volume. A cover chamber 44 is decisively determined and delimited by the outer wall of the second cover part 42. The air chamber of the cover chamber 44 expands the working chamber of the air spring and serves for comfortable spring behavior.

In addition, a second cover part 42 is provided for rolling bellows attachment and therefore comprises an annularly encircling clamping base 50 with an axial bearing surface for the upper rolling bellows end. For the purpose of improved clamping, the clamping base 50 is reinforced on the inner side by a metallic reinforcing ring 51. The reinforcing ring 51 counteracts the radial pressing force of the adjoining rolling bellows clamping and therefore supports the rolling bellows clamping with regard to its tightness requirement.

The air spring cover 40 is consequently assembled or joined together from cover parts 41 and 42. For this purpose, both cover parts 41 and 42 provide a joining region via which both cover parts 41 and 42 are welded to one another.

In order to configure the air spring cover 40 to be tear- or burst-resistant, a plurality of stiffening ribs 54 consisting of the material of the cover parts 41, 42 are formed in its interior. Starting from the outer wall of the pot wall 47, the stiffening ribs 54 are distributed in the direction of the inner wall of the first and second cover part 41, 42.

In addition, the stiffening ribs 54, which are formed by the material of the first and second cover part 41 and 42, have the advantage that their common joining region is enlarged. In other words, the contact surface to be welded of the two cover parts 41 and 42 is enlarged by the reinforcing ribs 54 and hence the bond strength of the two cover parts 41 and 42 is also increased.

In one or more embodiments, the air spring cover 40 shown in FIG. 3 is made from thermoplastic material. The statements made regarding the air spring cover of FIG. 2 relating to this material apply in an equivalent manner to the air spring cover 40 of FIG. 3. This particularly also concerns the strength requirements of the damper bearing receptacle 45 of the multipart air spring cover 40.

The second cover part 42 is likewise produced from a thermoplastic material. Fiber-reinforced thermoplastics preferably come into consideration for the volume-forming outer wall of the second cover part 42. Such thermoplastics can be a polyamide (PA6, PA6.6, PA12) filled with long glass fibers or with carbon fibers.

Furthermore, the air spring cover 40 shown in FIG. 3 is distinguished by its thermoplastic clamping base 50. Here, too, the statements given for the air spring cover of FIG. 2 apply in an equivalent manner to the multipart air spring cover 40 of FIG. 3. In a further embodiment, the clamping base 50 is reinforced on the inner side with a metallic reinforcing ring 51.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

LIST OF REFERENCE SIGNS

Air spring strut
Air spring
Shock damper
Air spring cover
Rolling piston
Rolling bellows
Outer guide
Rolling fold
Cardanic fold
Working chamber
Damper bearing
Inner locking ring
Bearing element
Damper tube
Piston rod
Additional spring
Supporting ring
Clamping ring
Corrugated bellows
Sealing system
Air spring cover
First cover part
Second cover part
Cover chamber
Damper bearing receptacle
Pot bottom
Pot wall
Pot collar
Additional-spring pot
Clamping base
Reinforcing ring
Fastening means
Receiving devices
Stiffening ribs

The invention claimed is:

1. An air spring strut for a motor vehicle, the air spring strut comprising:
an air spring with a shock damper for spring-cushioning and damping of oscillations of a motor vehicle chassis, wherein the air spring comprises an air spring cover and a rolling piston;
a rolling bellows of elastomer material clamped in an airtight manner between the air spring cover and the rolling piston,
wherein the air spring cover comprises:
a damper bearing receptacle, and a damper bearing of the shock damper is disposed within the damper bearing receptacle; and
a clamping base to which a first end of the rolling bellows is attached,
wherein at least the damper bearing receptacle of the air spring cover is produced completely from a thermoplastic material,
wherein the air spring cover comprises a plurality of receiving devices and a plurality of fastening means for attaching the air spring strut to the motor vehicle,
wherein each fastening means of the plurality of the fastening means is overmolded by the thermoplastic material of the air spring cover, and
wherein each fastening means of the plurality of fastening means is at least partially engaged in a respective receiving device of the plurality of receiving devices.

2. The air spring strut as claimed in claim 1, wherein the air spring cover comprises a ribbed structure having a plurality of stiffening ribs.

3. The air spring strut as claimed in claim 1, wherein the clamping base comprises a metallic reinforcing ring provided on an inner side of the clamping base.

4. The air spring strut as claimed in claim 1, wherein the air spring cover is produced in one piece.

5. The air spring strut as claimed in claim 1, wherein the air spring cover is of multipart configuration, at least comprising a first cover part, which comprises the damper bearing receptacle, and a second cover part, which comprises the clamping base.

6. The air spring strut as claimed in claim 5, wherein the first cover part and the second cover part are connected in an integrally bonded manner.

7. The air spring strut as claimed in claim 1, wherein the plastic material is a thermoplastic material comprises PA6, PA6.6, or PA12.

8. A chassis for a motor vehicle, the chassis comprising:

an air spring system having an air spring strut, the air spring strut comprising:

an air spring with a shock damper for spring-cushioning and damping of oscillations of a motor vehicle chassis, wherein the air spring comprises an air spring cover and a rolling piston;

a rolling bellows of elastomer material clamped in an airtight manner between the air spring cover and the rolling piston, wherein the air spring cover comprises:

a damper bearing receptacle, and a damper bearing of the shock damper is disposed within the damper bearing receptacle;

a clamping base to which a first end of the rolling bellows is attached;

a plurality of receiving devices and a plurality of fastening means for attaching the air spring strut to the motor vehicle, wherein at least the damper bearing receptacle of the air spring cover is produced completely from a thermoplastic material, wherein each fastening means of the plurality of the fastening means is overmolded by the thermoplastic material of the air spring cover, and wherein each fastening means of the plurality of fastening means is at least partially engaged in a respective receiving device of the plurality of receiving devices.

9. The chassis as claimed in claim 8, wherein the air spring cover comprises a ribbed structure having a plurality of stiffening ribs.

10. The chassis as claimed in claim 8, wherein the clamping base comprises a metallic reinforcing ring provided on an inner side of the clamping base.

11. The chassis as claimed in claim 8, wherein the air spring cover is produced in one piece.

12. The chassis as claimed in claim 8, wherein the air spring cover is of multipart configuration, at least comprising a first cover part, which comprises the damper bearing receptacle, and a second cover part, which comprises the clamping base.

13. The chassis as claimed in claim 8, wherein the plastic material is a thermoplastic material comprises PA6, PA6.6, or PA12.

* * * * *